United States Patent
Yilbas et al.

(10) Patent No.: US 8,165,855 B2
(45) Date of Patent: Apr. 24, 2012

(54) METHOD FOR MODELING FLUID FLOW OVER POROUS BLOCKS

(75) Inventors: Bekir Sami Yilbas, Dhahran (SA); Shahzada Zaman Shuja, Dhahran (SA); Mahmoud Kassas, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 335 days.

(21) Appl. No.: 12/453,926

(22) Filed: May 27, 2009

(65) Prior Publication Data

US 2010/0305911 A1    Dec. 2, 2010

(51) Int. Cl.
*G06F 7/60*    (2006.01)

(52) U.S. Cl. .......................................... 703/2

(58) Field of Classification Search ...... 703/2; 165/80.3
See application file for complete search history.

(56) References Cited

U.S. PATENT DOCUMENTS

| | | | |
|---|---|---|---|
| 4,051,891 A | 10/1977 | Harrison | |
| 5,727,622 A | 3/1998 | Gurevich et al. | |
| 6,196,307 B1 | 3/2001 | Ozmat | |
| 6,371,198 B1 | 4/2002 | Hirano | |
| 6,397,450 B1 | 6/2002 | Ozmat | |
| 6,424,529 B2 | 7/2002 | Eesley et al. | |
| 6,424,531 B1 | 7/2002 | Bhatti et al. | |
| 6,591,897 B1 | 7/2003 | Bhatti et al. | |
| 6,761,211 B2 | 7/2004 | Bhatti et al. | |
| 6,840,307 B2 | 1/2005 | Eesley et al. | |
| 2005/0175769 A1 | 8/2005 | Kunugi et al. | |
| 2006/0029541 A1 | 2/2006 | Tonkovich et al. | |
| 2007/0153480 A1 | 7/2007 | Zhang et al. | |
| 2010/0043230 A1* | 2/2010 | Bhatti ...................... | 29/890.046 |

FOREIGN PATENT DOCUMENTS

JP    59100398 A    6/1984

OTHER PUBLICATIONS

Shuja et al., Entropy Generation in Flow Field Subjected to a Porous Block in a Vertical Channel, Published online: Jun. 13, 2007, Springer Science+Business Media B.V. 2007, pp. 179-197.*
Y. Jaluria, Natural Convection Heat and Mass Transfer, 1980, Pergamon Press, New York, p. 80-84.*
S.Z. Shuja, B.S. Yilbas and M. Kassas, "Flow over porous blocks in a square cavity: Influence of heat flux and porosity on heat transfer rates", Intl. Journal of Thermal Sciences; Available online Jan. 15, 2009.

* cited by examiner

*Primary Examiner* — Dwin M Craig
*Assistant Examiner* — Juan Ochoa
(74) *Attorney, Agent, or Firm* — Richard C. Litman (57) ABSTRACT

The method of modeling fluid flow over porous blocks utilizes heat transfer and fluid flow equations and a discretization numerical method to model heat transfer rates in a square cavity containing a pair of porous blocks. Fluid flow and heat transfer are modeled within a square cavity having an inlet and an outlet formed therethrough. The inlet and outlet are positioned opposite one another along a diagonal of the square cavity. A laminar airflow is introduced at the cavity inlet while a constant heat flux is maintained in the pair of porous blocks.

12 Claims, 8 Drawing Sheets

METHOD FOR MODELING FLUID FLOW OVER POROUS BLOCKS

BACKGROUND OF THE INVENTION

1. Field of the Invention

The present invention relates to computerized numerical modeling and simulation methods, and particularly to a method of modeling fluid flow over porous blocks that utilizes heat transfer and fluid flow equations and a discretization numerical method to model heat transfer rates in a square cavity containing a pair of porous blocks.

2. Description of the Related Art

Figure 1:
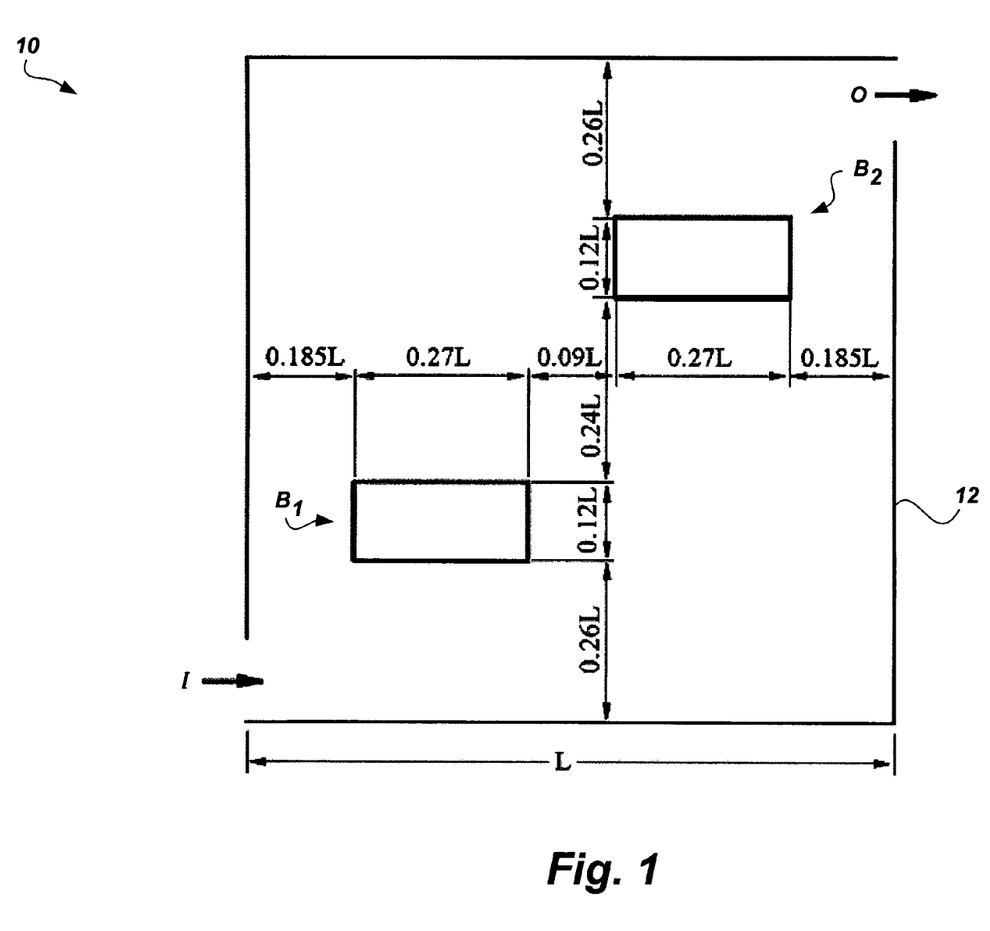
FIG. 1 is a diagrammatic view of a prior art system used to model heat transfer that includes a pair of porous blocks within a square cavity.

Porous structures are widely used to improve heat transfer rates in fluid flow systems. The porous structures are typically situated in and around heat-generating bodies that are subjected to convection cooling. In some cooling applications, the porous structures are situated in an open-end cavity with the fluid flow passing over the porous blocks. FIG. 1 illustrates a simplified fluid flow system 10, in which a pair of porous blocks $B_1$ and $B_2$ are positioned within a square cavity 12. Although the relative dimensions of first block $B_1$, second block $B_2$ and the cavity 12 may all be varied, for purposes of modeling (to be described in greater detail below), the square cavity has exemplary length of width of L, with blocks $B_1$ and $B_2$ each having a width of 0.12 L and a length of 0.27 L.

In the exemplary arrangement of FIG. 1, each of the blocks $B_1$, $B_2$ extends along a longitudinal axis, and inlet I and outlet O are arranged so that the input fluid flow and the output fluid flow travel along substantially longitudinal directions, with inlet I and outlet O being both longitudinally and laterally opposed from one another. Each of blocks $B_1$, $B_2$ is spaced a distance 0.26 L from its nearest, adjacent longitudinally extending wall, and 0.185 L from its nearest, adjacent laterally extending wall, as shown in the exemplary system 10 of FIG. 1. The first block $B_1$ is spaced apart a longitudinal distance of 0.09 L from the second block $B_2$, and a lateral distance of 0.48 L. The blocks in this exemplary configuration have an aspect ratio of 2.25 and an exemplary value for L, for purposes of simulation and modeling (as will be described in greater detail below), of 0.05 m.

Such porous structures are widely used in electronic device cooling applications. This is due to the fact that such an arrangement produces relatively high cooling rates. The porosity and heat flux are two of the important parameters influencing the flow structure and heat transfer rates around the heat transferring bodies. In system 10 of FIG. 1, a laminar airflow is introduced at inlet I of cavity 12, with a constant heat flux being maintained within the porous blocks $B_1$, $B_2$. The orientation and the aspect ratios of the porous blocks become important to enhance the heat transfer rates, while also lowering the fluid power losses in the cavity. Consequently, being able to accurately model and simulate the flow structure and heat transfer characteristics in such a flow system having a cavity and heat generating porous blocks becomes essential.

Thus, a method of modeling fluid flow over porous blocks solving the aforementioned problems is desired.

SUMMARY OF THE INVENTION

The method of modeling fluid flow over porous blocks uses heat transfer and fluid flow equations and a discretization numerical method to model heat transfer rates in a square cavity containing a pair of porous blocks. Fluid flow and heat transfer are modeled within a square cavity having an inlet and an outlet formed therethrough. The inlet and the outlet are positioned opposite one another along a diagonal of the square cavity (as described above with regard to FIG. 1). A laminar airflow is introduced at the cavity inlet, while a constant heat flux is maintained in the pair of porous blocks.

The method includes the steps of: (a) establishing a set of variables V, $E_f$, $\rho_f$, $k_{eff}$, T, $S^k_f$, and $K_{zz}$, wherein the variable $\rho_f$ is a fluid density, V is a velocity vector, $E_f$ is a fluid energy per unit mass, $k_{eff}$ represents an effective thermal conductivity in a porous medium, T is a temperature, p is a fluid pressure, $\tau$ is a shear stress vector, $\epsilon$ is a porosity, and $S^k_f$ is a fluid enthalpy source term; (b) calculating temperature, pressure and velocity variation in fluid flow within a cavity as $\nabla \cdot (V(\rho_f E_f + p)) = \nabla \cdot (k_{eff} \nabla T - \tau \cdot V) + S^k_f$; (c) establishing boundary conditions for the calculation of temperature, pressure and velocity variation; (d) calculating a Nusselt number as $$Nu = \frac{\overline{h}L}{k_{eff}},$$

wherein $\overline{h}$ represents an averaged heat transfer coefficient calculated as $$\overline{h} = \frac{q}{A \Delta T_{avg}},$$

where A represents a cross-sectional area of a porous block formed from the porous medium, $T_{avg}$ represents a temperature difference between an average surface temperature of the porous medium and a cavity inlet temperature $T_i$, L represents a length of the cavity, and q represents a heat transfer rate; (e) calculating a Grashoff number as $$Gr = \frac{g\beta(T_S - T_i)L^3}{v^2},$$

wherein g is a center of gravity, $\beta$ is a volumetric thermal expansion coefficient, v is a velocity along a first Cartesian axis, and $T_s$ is a surface temperature; and (f) displaying numerical results of the calculated temperature, pressure and velocity variations in the cavity.

In the above, the effective thermal conductivity in the porous medium is calculated as $k_{eff} = \epsilon k_f + (1-\epsilon)k_s$, where $k_f$ represents fluid phase thermal conductivity and $k_s$ represents solid medium thermal conductivity. The boundary conditions are established as $$\frac{\partial T}{\partial n} = 0,$$

u=v=0, and $$\frac{\partial \varphi}{\partial n} = 0,$$

where n is a user-selectable spatial coordinate (i.e., partial differential temperature variation in any direction is zero), U represents a velocity along a second Cartesian axis, and $\varphi$ is a flow property selected from the group consisting of temperature, flow velocity and pressure. The boundary conditions are further established to include temperature and heat flux continuity at solid block-fluid interfaces, such that $T_s=T_f$ and $$k_s\left(\frac{dT}{dn}\right)_s = k_f\left(\frac{dT}{dn}\right)_f,$$

where $T_s$ represents a surface temperature and $T_f$ represents a fluid temperature. Discretization is preferably performed using the SIMPLE algorithm, which is well known in the art of numerical analysis.

The method is computerized and embodied in software stored on a medium readable by a computer.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method of modeling fluid flow over porous blocks utilizes heat transfer and fluid flow equations and a discretization numerical method to model heat transfer rates in a square cavity containing a pair of porous blocks. Fluid flow and heat transfer are modeled within a square cavity 12 having an inlet I and an outlet O formed therethrough. The inlet I and the outlet O are positioned opposite one another along a diagonal of the square cavity 12 (as described above with regard to system 10 of FIG. 1). A laminar airflow is introduced at the cavity inlet I, while a constant heat flux is maintained in the pair of porous blocks $B_1$, $B_2$.

The equations governing the flow over a porous block situated in a channel are formulated by considering equilibrium conditions. At equilibrium, the porous medium can be defined as a material consisting of a solid matrix with an interconnected void, and it is assumed that a single fluid (single phase) occupies the void spaces. In the following, V represents a velocity vector, $\epsilon$ represents porosity, $\rho$ represents density, $\tau$ represents a shear stress, F represents a body force (including that due to buoyancy), $\mu$ represents viscosity, $C_1$ is an inertial resistance factor, p is fluid pressure, and $\alpha$ is a viscous loss coefficient. Assuming isotopic porosity and single phase steady flow, the volume-averaged mass and momentum conservation equations for a steady flow situation can be written in vector notation as:

$$\nabla \cdot (\varepsilon \rho V) = 0 \qquad (1)$$

$$\nabla \cdot (\varepsilon \rho VV) = -\varepsilon \nabla p + \nabla \cdot (\varepsilon \tau) + \varepsilon F - \left(\frac{\mu}{\alpha} + \frac{C_1 \rho}{2}|V|\right)V \qquad (2)$$

The last term in equation (2) represents the viscous Darcy loss and inertial drag forces imposed by the pore walls on the fluid. It should be noted that $\epsilon$ is the porosity of the media, which is defined as the ratio of the volume occupied by the fluid to the total volume. However, the term $$\left(\frac{\mu}{\alpha} + \frac{C_1 \rho}{2}|V|\right)V$$

in equation (2) is the source term due to the porous media.

Outside of the porous media, however, the source term drops and $\epsilon=1$. Therefore, equation (2) reduces to the standard momentum equation for a single-phase steady fluid flow. The coefficient $\alpha$ in the viscous loss term equals K, which represents the constant permeability of the porous structure. The coefficient $C_1$ in the inertial loss term is written as $$C_1 = \frac{f}{\sqrt{K}},$$

where f is the inertia coefficient reflecting porous inertia effects. Table I below gives exemplary values for f and K for two porous blocks, $B_1$ and $B_2$, for purposes of modeling.

TABLE I

| Block | Porosity ($\epsilon$) | f | K ($\times 10^{-7}$ m$^2$) |
|---|---|---|---|
| $B_1$ | 0.9726 | 0.097 | 2.7 |
| $B_2$ | 0.8991 | 0.068 | 0.94 |

The standard energy transport equation in porous media regions is solved with modifications to the conduction flux and the transient terms only. In a porous medium, the conduction flux uses an effective conductivity, and the transient terms include the thermal inertia of the solid region on the medium:

$$\nabla \cdot (V(\rho_f E_f + p)) = \nabla \cdot (k_{eff} \nabla T - \tau \cdot V) + S_f^k \qquad (3)$$

where $\rho_f$ is the fluid density, $E_f$ is the fluid energy per unit mass, $k_{eff}$ represents effective thermal conductivity, T is temperature, and $S_f^k$ is the fluid enthalpy source term. The effective thermal conductivity in the porous medium, $k_{eff}$, is the volume average of the fluid conductivity and the solid conductivity:

$$k_{eff} = \epsilon k_f (1-\epsilon) k_s \qquad (4)$$

where $k_f$ is the fluid phase thermal conductivity (including the turbulent contribution $k_t$), and $k_s$ is the solid medium thermal conductivity. In the case of a fluid, the governing equations of flow are modified, and $\alpha$ in equations (1), (2) and (3) is set to 1. Additionally, $k_{eff}$ becomes $k_f$ (the fluid thermal conductivity) in equation (4). The calculation of temperature, pressure and velocity variation in fluid flow within a cavity given by equation (3) above are represented by block 200 in the flow diagram of FIG. 8.

Two solid blocks $B_1$ and $B_2$ having different geometric arrangements in an open-end cavity are considered in the following simulation. The surface area of each block is assumed to be held constant. Table II below provides exemplary dimensions for the purposes of a modeling example. The exemplary dimensions are taken in conjunction with those described above with regard to the arrangement of system 10 of FIG. 1.

TABLE II

| Cavity length | L (0.05 m) |
|---|---|
| Cavity width | L (0.05 m) |
| Total area of each block | $(0.18 L)^2 = 8.1 \times 10^{-5}\ m^2$ |
| Cavity inlet port size | 0.2 L (0.01 m) |
| Cavity outlet port size | 0.2 L (0.01 m) |
| Cavity inlet velocity | 0.1544 m/s |
| $Re_{inlet}$ | 100 |
| Rate of heat generation (q) | $(1, 2, 3, 4) \times 10^5\ W/m^3$ |
| Porosity of each block | 0, 0.9726, 0.8991 |

In the below analysis, four separate configurations of the blocks in the cavity are simulated. Moreover, the velocity magnitude is normalized through dividing the velocity magnitude by the cavity inlet velocity. The adiabatic cavity walls are considered to have no slip and impermeable wall conditions for the velocity components, such that the boundary conditions are:

$$\frac{\partial T}{\partial n} = 0, \quad (5)$$
$$u = v = 0$$

where n is any selected spatial coordinate, u represents velocity in the Cartesian x-axis and v represents velocity in the y-axis. The pressure boundary is assumed to be at the cavity outlet O, while uniform flow and temperature are assumed at the cavity inlet I, such that:

$$\frac{\partial \varphi}{\partial n} = 0 \quad (6)$$

where $\varphi$ is any selected property of the fluid (i.e., temperature or flow). The establishment of such boundary conditions are shown as block 202 in FIG. 8.

Uniform heat generation q is introduced in the rectangular, porous solid blocks, as noted above, and temperature and heat flux continuity are assumed at the solid block-fluid interfaces, such that:

$$T_s = T_f \text{ and } k_s \left(\frac{dT}{dn}\right)_s = k_f \left(\frac{dT}{dn}\right)_f \quad (7)$$

For purposes of an exemplary simulation using the present inventive method, air is used as the flowing fluid, with blocks $B_1$ and $B_2$ being formed from steel. The properties of air at standard pressure and temperature, along with the thermal properties of steel blocks, are given in Table III, below.

TABLE III

| | Air | Steel blocks |
|---|---|---|
| Density (kg/m³) | 1.177 | 7836 |
| Specific Heat (J/kg K) | 1005 | 969 |
| Thermal Conductivity (W/m K) | 0.02565 | 28.2 |
| Viscosity (m²/s) | $1.544 \times 10^{-5}$ | — |

Figure 8:
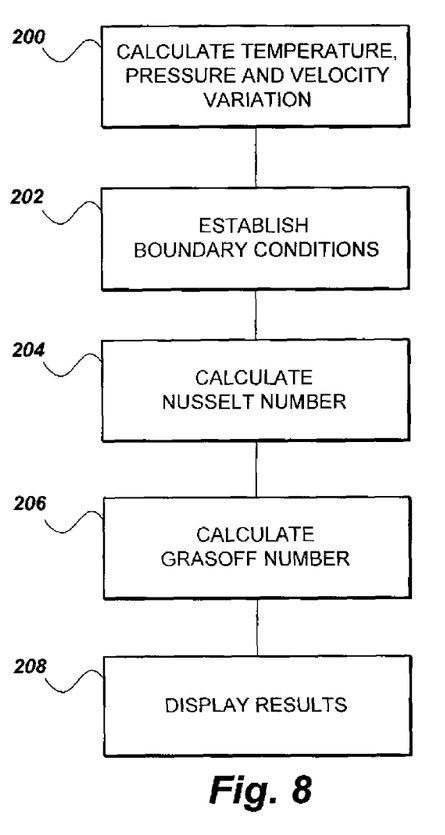
FIG. 8 is a flow diagram illustrating the method steps of the method of modeling fluid flow over porous blocks according to the present invention.

The averaged heat transfer coefficient is determined from:

$$\bar{h} = \frac{q}{A \Delta T_{avg}} \quad (8)$$

where A is the cross sectional area of the porous block, $T_{avg}$ is the temperature difference between the average surface temperature of the porous media and the cavity inlet temperature, and $\bar{h}$ is the averaged heat transfer coefficient. The Nusselt number (block 204 in FIG. 8) is determined by:

$$Nu = \frac{\bar{h}L}{k_{eff}} \quad (9)$$

and the Grashoff number (block 206 in FIG. 8) is given as:

$$Gr = \frac{g\beta(T_s - T_i)L^3}{v^2} \quad (10)$$

where g is the center of gravity, $\beta$ is the volumetric thermal expansion coefficient, $T_s$ is the surface temperature and $T_i$ is the cavity inlet temperature.

In order to calculate wall temperature difference as a function of axial distance, the Nusselt number, the Grashoff number, normalized fluid flow velocity, normalized temperature and pressure within cavity 12, a numeric technique is utilized. The flow domain is overlaid with a rectangular grid and a control volume approach is employed. All variables are computed at each grid point except the velocities, which are determined midway between the grid points. The control volume technique is well known for providing numeric solutions.

In fluid mechanics and thermodynamics, a control volume is a mathematical abstraction employed in the process of creating mathematical models of physical processes. In an inertial frame of reference, it is a fixed volume in space through which the fluid flows. The surface enclosing the control volume is referred to as the control surface. At steady state, a control volume can be thought of as an arbitrary volume in which the mass of the fluid remains constant. As fluid moves through the control volume, the mass entering the control volume is equal to the mass leaving the control volume. At steady state, and in the absence of work and heat transfer, the energy within the control volume remains constant.

Typically, to understand how a given physical law applies to the system under consideration, one first begins by considering how it applies to a small, control volume, or "representative volume". There is nothing special about a particular control volume, it simply represents a small part of the system to which physical laws can be easily applied. This gives rise to what is termed a volumetric, or volume-wise formulation of the mathematical model.

One can then argue that since the physical laws behave in a certain way on a particular control volume, they behave the same way on all such volumes, since that particular control volume was not special in any way. In this way, the corresponding point-wise formulation of the mathematical model can be developed so it can describe the physical behavior of an entire (and maybe more complex) system. In fluid mechanics, the conservation equations (Navier-Stokes equations) are integrals. Therefore, they apply to volumes. Finding forms of the equation that are independent of the control volumes allows simplification of the integral signs.

The grid independent tests are performed, and preferably a 192×192 grid size is selected on the basis of grid independent solutions with low computation time. A staggered grid arrangement is used in the simulation, which provides the pressure linkages through the continuity equation, which is known in the art as the "SIMPLE algorithm". In computational fluid dynamics (CFD), the SIMPLE algorithm is a widely used numerical procedure to solve the Navier-Stokes equations. SIMPLE is an acronym for Semi-implicit Method for Pressure Linked Equations.

This procedure is an iterative process for convergence. The pressure link between continuity and momentum is established by transforming the continuity equation into a Poisson equation for pressure. To simulate the flow field and heat transfer rates from the blocks, FLUENT code is preferably used in relation to the numerical scheme and boundary conditions introduced in the model.

For purposes of comparison, an experiment was carried out using a metal foam in order to validate the modeling technique. The simulation conditions were kept identical to the experimental parameters. In this case, a fully developed flow inlet to the duct, partially filled with the metal foam and having dimensions of 63 mm×45 mm×114 mm size was considered. The characteristics of the metal foam are given in Table IV, below.

TABLE IV

| Porosity ($\epsilon$) | f | K ($\times 10^7 \, m^2$) |
|---|---|---|
| 0.9118 | 0.085 | 1.8 |

Figure 2:
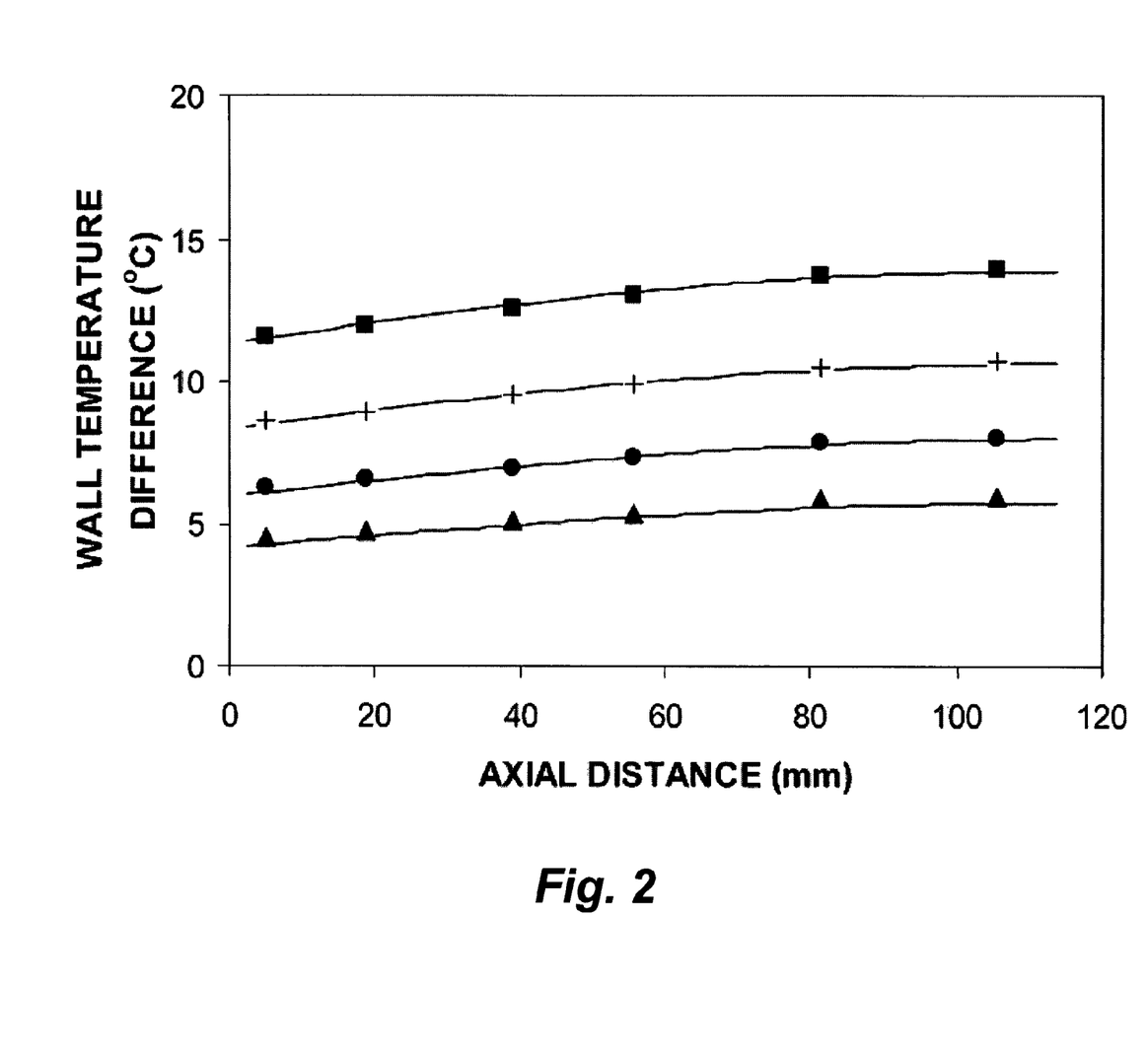
FIG. 2 is a graph illustrating wall temperature as a function of axial distance, comparing wall temperature predicted by the method of modeling fluid flow over porous blocks according to the present invention with experimental data.

Constant heat generation from the top and bottom walls of the duct is considered to be consistent in the simulation. FIG. 2 shows the predictions obtained from the model simulation compared with the experimental results.

In addition to wall temperature differences, normalized velocity ($V/V_i$) in the cavity for different heat fluxes and porosities may also be calculated. The influence of the porosity on the flow structure is more pronounced than that of the heat flux. Increasing porosity of the blocks allows fluid penetration through the porous blocks and mixing of the fluid with the convection current downstream of the blocks. However, a natural convection current develops around the blocks and contributes to flow mixing in the cavity. This is found to be more pronounced behind the blocks.

The forced convection current is dominant in the region of the sides of the blocks and below the blocks. However, flow circulation in the region of the corners, other than inlet I and outlet O, is not easily shown. In this case, flow entering from the inlet I splits around the first block and merges in downstream of the block before undergoing a secondary splitting around the second block. Consequently, the forced convection current dominates in this region.

In the region of the cavity outlet O, flow acceleration is prominent, with the pressure drop in this region being responsible for the flow acceleration. In addition, a small circulation cell is found to develop at the bottom corner of the first block. The size and the orientation of the circulation cell change with the magnitude of the heat flux.

In the case of a solid block (i.e., $\epsilon=0$), flow circulation occurs on the left side of the block. This is caused by the flow splitting around the first block. Once the axial momentum in this region is reduced due to the shear layer developed around the solid block, the flow circulation results. However, the effect of the heat flux on the flow structure in this region is not significant; i.e., the size and the orientation of the circulation cell remains almost the same at different magnitudes of the heat flux in the solid body.

Similarly, normalized temperature ($T/T_i$) contours in the cavity for different porosities and heat fluxes can be calculated. In addition to providing numerical results, the normalized velocity magnitude and normalized temperature may be visually displayed to the user as color contour maps or the like (block 208 in the flow diagram of FIG. 8). The influence of the heat flux on the temperature field is found to be significant. Increasing heat flux enhances the high temperature field above the first block. This situation is more pronounced for the porous blocks. Increasing the porosity enhances the rate of flow penetrating through the porous blocks.

Since the temperature of the working fluid increases through the penetration, the high temperature region extends into the cavity. The natural convection current emanating from the heated porous blocks contributes to this extension. Moreover, in the region where the forced convection current dominates in the cavity, a low temperature region dominates in the cavity. This is due to the low temperature fluid entering into the cavity, which splits around the first block, as well as the convective current passing below the cavity not losing its axial momentum while accelerating towards the cavity outlet O. Consequently, low temperature fluid flow dominates in this region.

In the case of a solid block, contribution of the natural convection current to the high temperature region, which is formed behind the blocks, is found to be significant. Since the solid blocks are at higher temperature than the fluid temperature, the thermal boundary layer developed around the block becomes thicker in the region where the forced convection current becomes ineffective. Consequently, the thickening of the thermal boundary layer contributes to the natural convection current and the extension of the high temperature region in the cavity. This is found to be more pronounced in the region above the first block, where mixing of forced and natural convection currents is minimal in the cavity.

Similarly, pressure coefficients in the cavity for different porosities and heat flux magnitudes may be calculated and displayed to the user as color contour mapping or the like. The pressure coefficient is found to lower in the region where the forced and natural convection currents are high. Increasing porosity reduces the pressure coefficient behind the blocks, which is found to be more pronounced for the first block. The reduction in the pressure coefficient is due to the fluid penetration into the block. Increasing the heat flux enhances the pressure coefficient due to extension of the high temperature field in the cavity. In this case, the thermodynamic pressure contribution to the pressure coefficient becomes important, since the working fluid is air. However, in all cases, the pressure drop at the cavity outlet O is found to be prominent. The flow acceleration toward the cavity outlet O and frictional losses in the cavity are responsible for the pressure drop at outlet O.

In the case of a solid block, the pressure coefficient changes significantly in the region where the flow acceleration is high.

This is because of the blockage effect of the solid block in the cavity. In addition, the thermodynamic pressure contribution to the pressure rise becomes significant around the blocks, particularly in the region behind the blocks.

Figure 3:
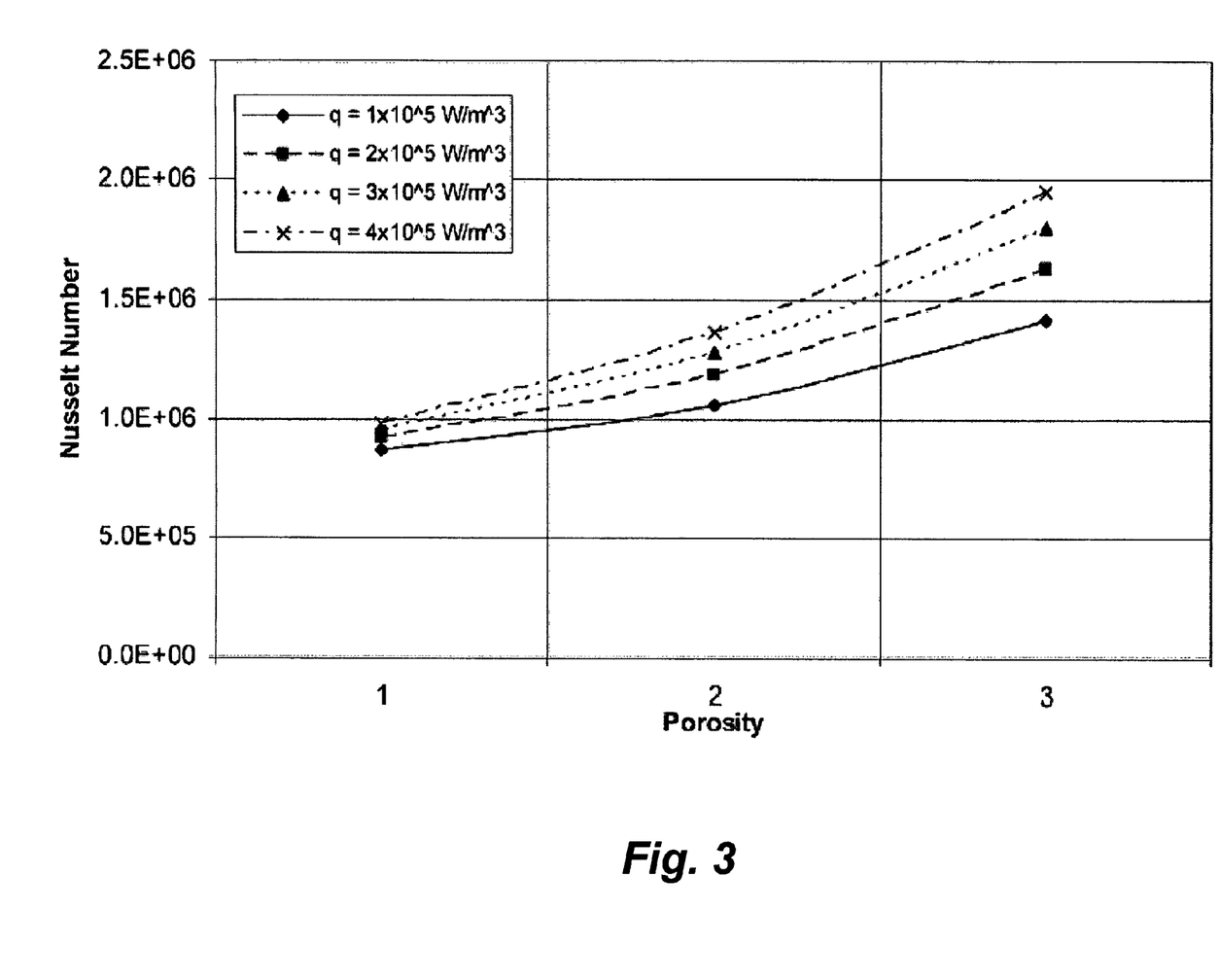
FIG. 3 is a graph illustrating Nusselt number variation with the porosity of the first block of the system of FIG. 1.
Figure 4:
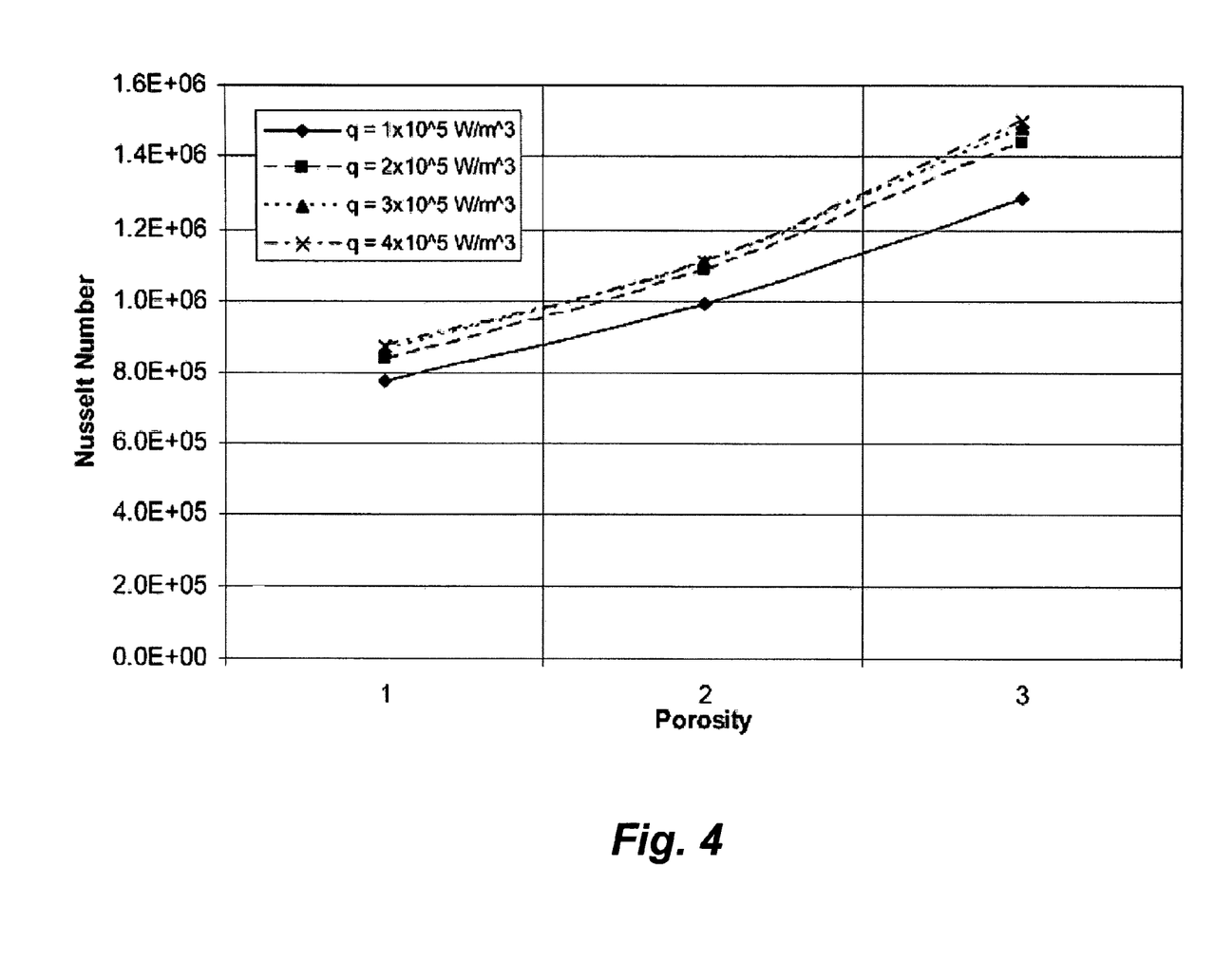
FIG. 4 is a graph illustrating Nusselt number variation with the porosity of the second block of the system of FIG. 1.

FIGS. 3 and 4 show the Nusselt number variations with porosity for blocks $B_1$ and $B_2$, respectively. The Nusselt number increases with increasing porosity. This is due to the flow penetration through the porous blocks. The forced convection current passing through the porous blocks enhances the cooling rates. In addition, the small thermal boundary layer around the porous blocks imposes temperature gradients in the vicinity of the blocks. This further enhances conduction heat transport from the blocks to the working fluid. This situation occurs particularly for high porosities. Increasing the heat flux increases the temperature of the porous blocks. Since the cavity inlet temperature of the working fluid is constant, increasing the heat flux increases the temperature gradient in the neighborhood of the blocks while enhancing the heat transfer from blocks to the working fluid.

This improves the Nusselt number for both blocks. This situation is clearly observed for the high heat flux and the porosity. When comparing the Nusselt number corresponding to blocks $B_1$ and $B_2$, block $B_1$ results in a slightly high Nusselt number due to its orientation in the cavity, i.e., it is located close to the cavity inlet I. Consequently, low temperature fluid entering into the cavity results in the high temperature gradient in the vicinity of the first block while enhancing the Nusselt number. The effect of block orientation on the Nusselt number is more pronounced at high porosities. In this case, the forced convection cooling of the first block through the fluid penetration contributes significantly to the enhancement of the Nusselt number.

Figure 5:
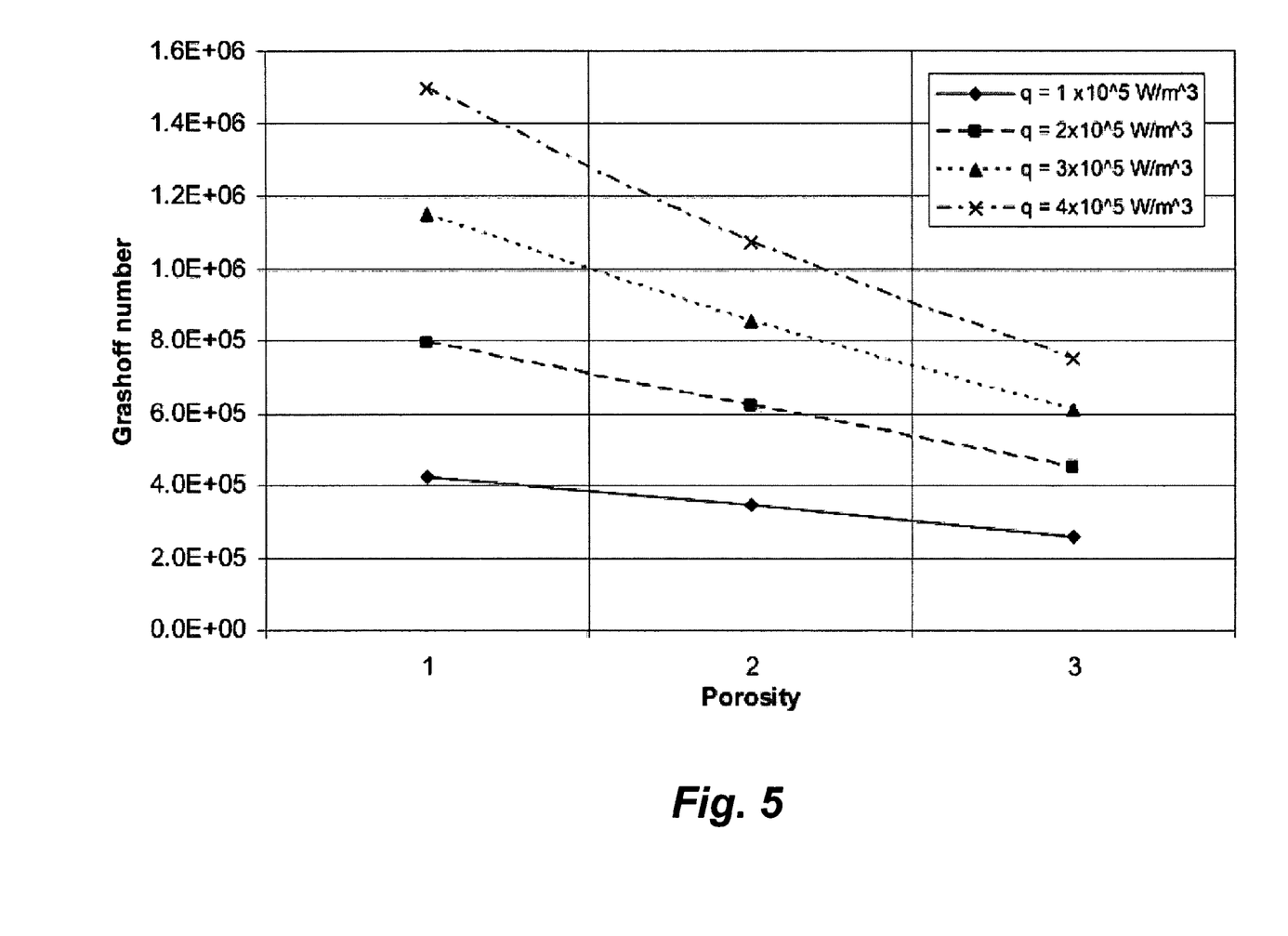
FIG. 5 is a graph illustrating Grashoff number variation with the porosity of the first block of the system of FIG. 1.
Figure 6:
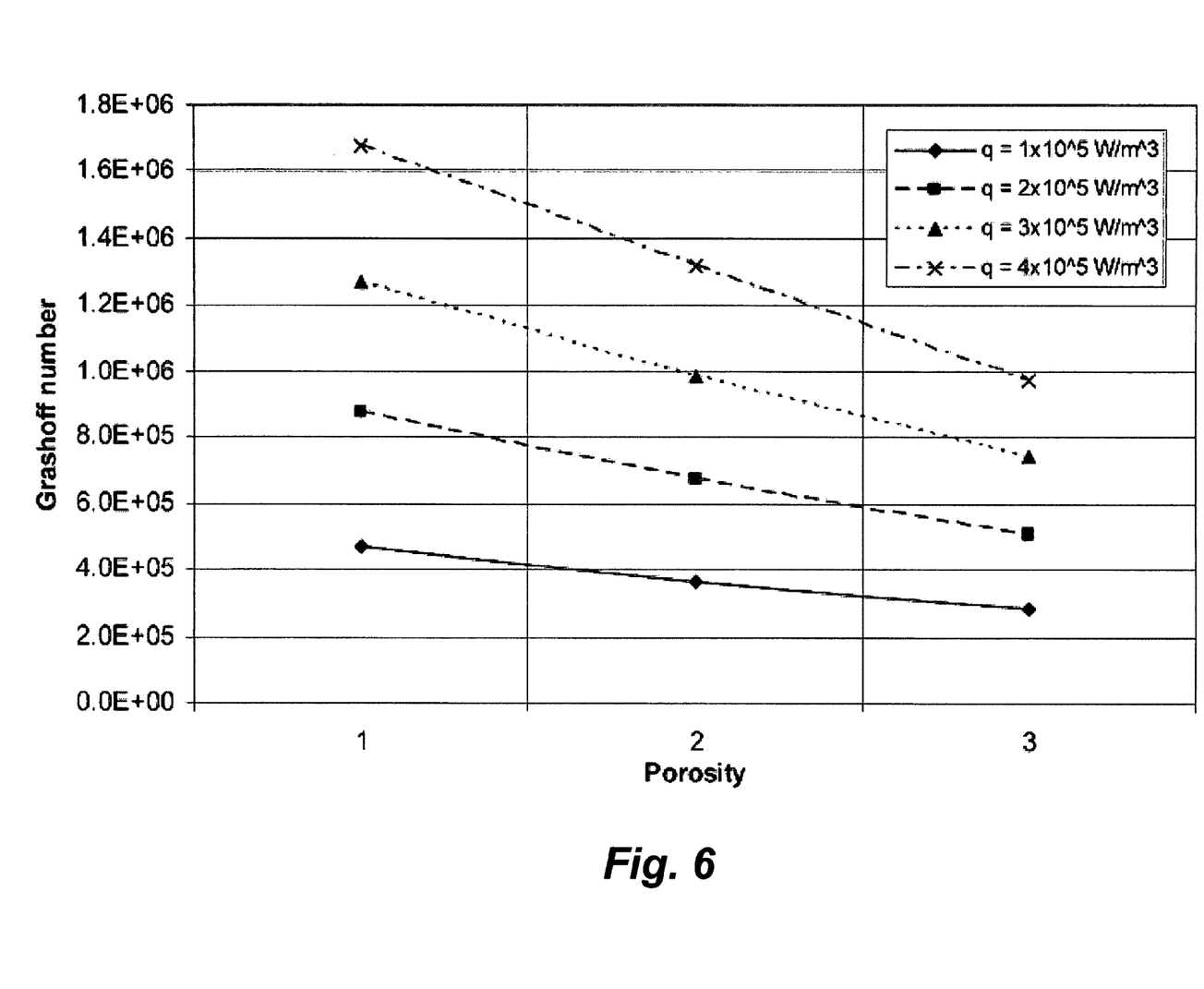
FIG. 6 is a graph illustrating Grashoff number variation with the porosity of the second block of the system of FIG. 1.

FIGS. 5 and 6 show the Grashoff number variations with porosity for blocks $B_1$ and $B_2$, respectively, and for different heat fluxes. The Grashoff number decreases with increasing porosity. However, it increases with increase of the heat flux. Surface temperature of the porous blocks reduces with increasing porosity due to enhancement in the heat transfer rates. Moreover, an increase in the heat flux results in high temperature at the surface of the porous blocks, enhancing the Grashoff number. When comparing the Grashoff number for blocks $B_1$ and $B_2$, respectively, the Grashoff number attains high values for $B_2$. This is associated with the temperature field in the cavity and the surface temperature of the blocks. Consequently, enhancement in heat transfer reduces the Grashoff number while improving the Nusselt number around the blocks.

In the above, the flow structure and the heat transfer around the porous blocks situated in the square cavity are considered in the simulation. The effects of the heat flux and the porosity on the heat transfer rates are also examined. In the simulations, as shown in FIGS. 2, 3, 4, 5 and 6, three porosities and four heat fluxes are used as examples, with air being used as the working fluid. It is found that increasing porosity of the blocks modifies the flow field in the cavity, and the flow emerging from the porous blocks contributes to the forced convection current. Increasing the heat flux influences the flow structure. In this case, the thermodynamic pressure and the natural convection current in the cavity become important. Enhancement of the Nusselt number with increasing porosity of the blocks is associated with the forced convection cooling of the porous blocks, which is more pronounced for the first block $B_1$.

The heat flux influences the Nusselt number in such a way that the Nusselt number increases with the increasing heat flux. This is because of the development of the high temperature gradient in the neighborhood of the blocks. When comparing the Nusselt number corresponding to the first and the second blocks, the Nusselt number attains high values for the first block. This is because of the location of the first block in the cavity, which is close to the cavity inlet. The Grashoff number reduces with increasing porosity. However, it enhances with increasing heat flux. This is found to be more pronounced for the second block.

Figure 7:
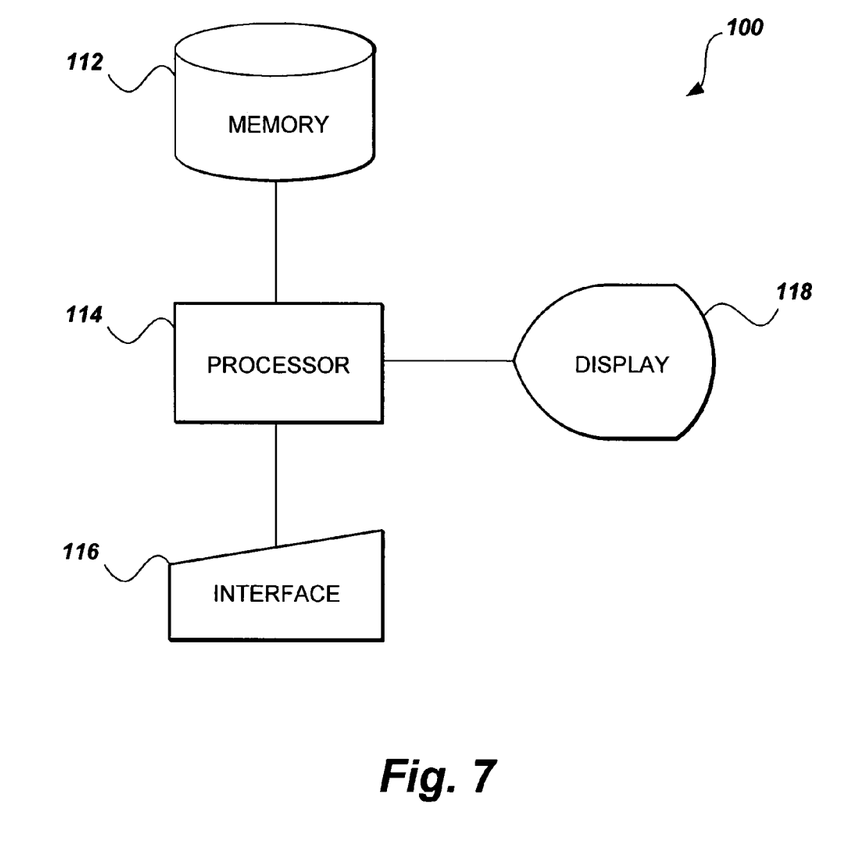
FIG. 7 diagrammatically illustrates a system for implementing the method of modeling fluid flow over porous blocks according to the present invention.

In the above, the calculations may be performed by any suitable computer system, such as that diagrammatically shown in FIG. 7. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

The method may be implemented in software in any suitable software language, including C, C++, Visual C, Visual C++, Visual Basic, Java, FORTRAN, etc. The software program may be stored on any computer readable medium, including a floppy disc, a hard disk, a CD-ROM, a DVD, punch cards, a laser disk, or any optical or magnetic media for storing a computer software program in such a form that the instructions may be retrieved and executed by a processor.

It is to be understood that the present invention is not limited to the embodiments described above, but encompasses any and all embodiments within the scope of the following claims.

We claim:

1. A computerized method of modeling fluid flow over porous blocks, comprising the steps of:

establishing a set of variables V, $E_f$, $\rho_f$, $k_{\mathit{eff}}$, T, and $S^k_f$, wherein the variable $\rho_f$ is a fluid density, V is a velocity vector, $E_f$ is a fluid energy per unit mass, $k_{\mathit{eff}}$ represents an effective thermal conductivity in a porous medium of a plurality of porous media, T is a temperature, p is a fluid pressure, $\tau$ is a shear stress vector, $\epsilon$ is a porosity, and $S^k_f$ is a fluid enthalpy source term;

calculating temperature, pressure and velocity variation in fluid flow within a cavity as $\nabla \cdot (V(\rho_f E_f + p)) = \nabla \cdot (k_{\mathit{eff}} \nabla T - \tau \cdot V) + S^k_f$ for each said porous medium of the plurality of porous media;

establishing boundary conditions for the calculation of temperature, pressure and velocity variation, wherein the cavity comprises a square cavity having a longitudinally opposed inlet and outlet;

calculating a Nusselt number for each said porous medium as $$Nu = \frac{\bar{h}L}{k_{\mathit{eff}}},$$

wherein $\bar{h}$ represents an averaged heat transfer coefficient calculated as $$\bar{h} = \frac{q}{A \Delta T_{avg}},$$

where A represents a cross-sectional area of a porous block respectively formed from each said porous medium, $T_{avg}$ represents a temperature difference between an average surface temperature of the respective porous medium and a cavity inlet temperature $T_i$, L represents a length of the cavity, and q represents a heat transfer rate, wherein a longitudinal length of each said porous block is 0.27 L;

calculating a Grashoff number as $$Gr = \frac{g\beta(T_s - T_i)L^2}{v^2},$$

wherein g is a center of gravity, $\beta$ is a volumetric thermal expansion coefficient, v is a velocity along a first Cartesian axis, and $T_s$ is a surface temperature; and displaying numerical results of the calculated temperature, pressure and velocity variations in the cavity, wherein the numerical results include the Nusselt number and the Grashoff number.

2. The computerized method of modeling fluid flow over porous blocks as recited in claim 1, wherein the effective thermal conductivity in the respective porous medium is calculated as $k_{eff} = \epsilon k_f + (1-\epsilon)k_s$, wherein $k_f$ represents a fluid phase thermal conductivity and $k_s$ represents a solid medium thermal conductivity.

3. The method of modeling fluid flow over porous blocks as recited in claim 2, wherein the boundary conditions are established as $$\frac{\partial T}{\partial n} = 0,$$

$$u = v = 0,$$

and $$\frac{\partial \varphi}{\partial n} = 0,$$

wherein n is a user-selectable spatial coordinate, u represents a velocity along a second Cartesian axis, and $\varphi$ is a flow property selected from the group consisting of temperature, flow velocity and pressure.

4. The method of modeling fluid flow over porous blocks as recited in claim 3, wherein the boundary conditions are further established to include temperature and heat flux continuity at solid block-fluid interfaces, such that $$T_s = T_f$$

and $$k_s\left(\frac{dT}{dn}\right)_s = k_f\left(\frac{dT}{dn}\right)_f,$$

respectively, wherein $T_s$ represents a surface temperature, $T_f$ represents a fluid temperature, $$\left(\frac{dT}{dn}\right)_s$$

represents a temperature gradient at a solid block side of the solid block-fluid interfaces, and $$\left(\frac{dT}{dn}\right)_f$$

represents a temperature gradient at a fluid side of the solid block-fluid interfaces.

5. The method of modeling fluid flow over porous blocks as recited in claim 4, further comprising a discretization step, comprising application of the SIMPLE algorithm.

6. The computerized method of modeling fluid flow over porous blocks as recited in claim 5, wherein a lateral width of each said porous block is 0.12 L.

7. The computerized method of modeling fluid flow over porous blocks as recited in claim 6, wherein each said porous block is laterally spaced from an adjacent wall of said square cavity by a distance of 0.26 L.

8. The computerized method of modeling fluid flow over porous blocks as recited in claim 7, wherein each said porous block is longitudinally spaced from an adjacent wall of said square cavity by a distance of 0.185 L.

9. A system for modeling fluid flow over porous blocks, comprising:

a processor;
computer readable memory coupled to the processor;
a user interface coupled to the processor;
a display coupled to the processor
software stored in the memory and executable by the processor, the software having computer readable instructions embedded on a media and operable when executed to:

calculate temperature, pressure and velocity variation in fluid flow within a cavity as $\nabla \cdot (V(\rho_f E_f + p)) = \nabla \cdot (k_{eff}\nabla T - \tau \cdot V) + S_f^k$ for each porous medium of a plurality of porous media, wherein $\rho_f$ is a fluid density, V is a velocity vector, $E_f$ is a fluid energy per unit mass, $k_{eff}$ represents an effective thermal conductivity in the porous medium of the plurality of porous media, T is a temperature, p is a fluid pressure, $\tau$ is a shear stress vector, and $S_f^k$ is a fluid enthalpy source term;

establish boundary conditions for the calculation of temperature, pressure and velocity variation, wherein the cavity comprises a square cavity having a longitudinally opposed inlet and outlet;

calculate a Nusselt number for each said porous medium as $$Nu = \frac{\bar{h}L}{k_{eff}},$$

wherein $\bar{h}$ represents an averaged heat transfer coefficient calculated as $$\bar{h} = \frac{q}{A\Delta T_{avg}},$$

where A represents a cross-sectional area of a porous block respectively formed from each said porous medium, $T_{avg}$ represents a temperature difference between an average surface temperature of the respective porous medium and a cavity inlet temperature $T_i$, L represents a length of the cavity, and q represents a heat transfer rate, wherein a longitudinal length of each said porous block is 0.27 L;

calculate a Grashoff number as $$Gr = \frac{g\beta(T_s - T_i)L^2}{v^2},$$

wherein g is a center of gravity, β is a volumetric thermal expansion coefficient, v is a velocity along a first Cartesian axis, and $T_s$ is a surface temperature; and display numerical results of the calculated temperature, pressure and velocity variations in the cavity, wherein the numerical results include the Nusselt number and the Grashoff number.

10. The system for modeling fluid flow over porous blocks as recited in claim 9, wherein a lateral width of each said porous block is 0.12 L.

11. The system for modeling fluid flow over porous blocks as recited in claim 10, wherein each said porous block is laterally spaced from an adjacent wall of said square cavity by a distance of 0.26 L.

12. The system for modeling fluid flow over porous blocks as recited in claim 11, wherein each said porous block is longitudinally spaced from an adjacent wall of said square cavity by a distance of 0.185 L.

* * * * *